United States Patent [19]

Hahn et al.

[11] Patent Number: 4,483,812
[45] Date of Patent: Nov. 20, 1984

[54] VALVE PLATE AND FEEDBLOCK DESIGN FOR CO-EXTRUSION APPARATUS AND CO-EXTRUSION PROCESS USING SAME

[75] Inventors: Granville J. Hahn; Raleigh N. Rutledge; Jackie D. Murley, all of Big Spring, Tex.

[73] Assignee: Cosden Technology, Inc., Dallas, Tex.

[21] Appl. No.: 485,550

[22] Filed: Apr. 15, 1983

[51] Int. Cl.³ .................................................. B29F 3/04
[52] U.S. Cl. ................................... 264/171; 264/40.7;
425/131.1; 425/133.5; 425/381; 425/462; 425/466
[58] Field of Search .................. 264/171, 173, 176 R, 264/177 R, 40.7; 425/131.1, 146, 133.1, 133.5, 376 A, 465, 381, 466, 462

[56] References Cited

U.S. PATENT DOCUMENTS

| | | | |
|---|---|---|---|
| 1,443,324 | 1/1923 | McGovern | 425/466 |
| 3,390,432 | 7/1968 | Becker et al. | 425/466 |
| 3,545,043 | 12/1970 | Schwindy | 425/381 |
| 3,555,128 | 1/1971 | Schrenk | 264/171 |
| 3,680,997 | 8/1972 | Dukert et al. | 425/381 |
| 3,743,143 | 7/1973 | Barney et al. | 264/171 |
| 3,761,211 | 9/1973 | Parkinson | 425/462 |
| 3,815,637 | 6/1974 | Carrow | 425/466 |
| 3,909,170 | 9/1975 | Riboulet | 425/462 |
| 3,924,997 | 12/1975 | Kosinsky | 425/466 |
| 4,279,857 | 7/1981 | Feuerherm | 425/465 |

FOREIGN PATENT DOCUMENTS

| | | | |
|---|---|---|---|
| 1202973 | 7/1961 | Fed. Rep. of Germany | 425/466 |
| 51-68670 | 6/1976 | Japan | 425/133.5 |
| 53-4070 | 1/1978 | Japan | 425/462 |
| 55-28825 | 2/1980 | Japan | 264/171 |
| 57-17701 | 4/1982 | Japan | 264/171 |
| 2089719A | 6/1982 | United Kingdom | 425/462 |

*Primary Examiner*—Jeffery Thurlow
*Attorney, Agent, or Firm*—Schwartz, Jeffery, Schwaab, Mack, Blumenthal & Koch

[57] ABSTRACT

Disclosed is an apparatus and process for producing multiple-layer film or sheeting which includes an improved laydown means comprising adjustable cam-actuated control means for controlling the polymer flow and individual layer thickness.

13 Claims, 13 Drawing Figures

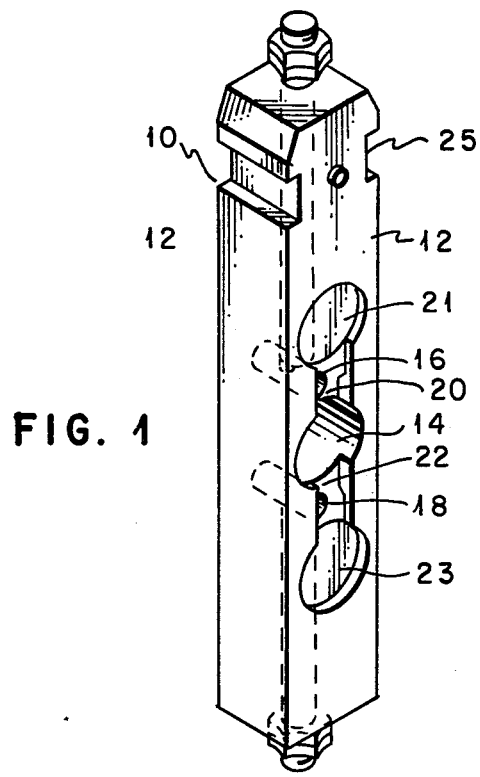
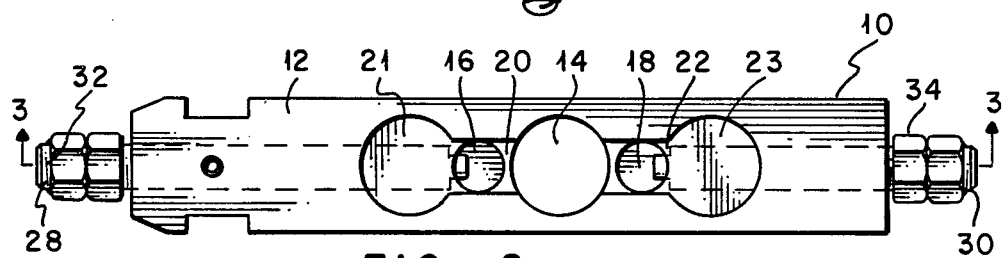
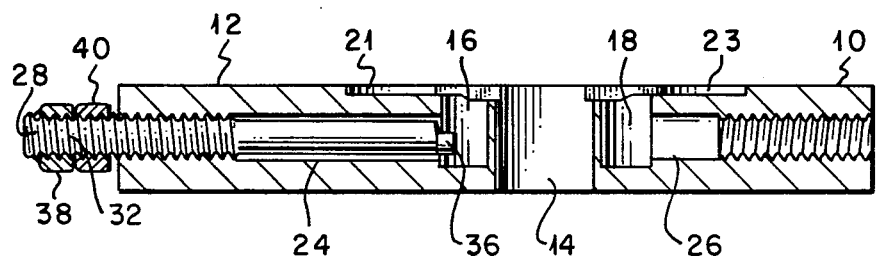
FIG. 1
FIG. 2
FIG. 3

VALVE PLATE AND FEEDBLOCK DESIGN FOR CO-EXTRUSION APPARATUS AND CO-EXTRUSION PROCESS USING SAME

BACKGROUND OF THE INVENTION

The present invention relates to the production of multiple-layer film or sheeting, and more especially, to a process and apparatus for the extrusion of multiple-layer sheeting having a layer or layers of polymeric material having desirable surface characteristics. More especially, the present invention pertains to the co-extrusion of multiple-layer sheeting, with each layer exhibiting uniform layer thickness across the width thereof, by an apparatus which has an improved laydown means and which is easily adjustable to produce sheeting products having desired thicknesses.

Co-extrusion processes for the production of multi-layer sheeting are, of course, well known in the art. However, prior processes do not guarantee, and often do not produce, a co-extruded layer of uniform thickness on the main extruded material. This problem is especially acute when the co-extruded layer comprises a polymeric material having a comparatively low viscosity. Such a material tends to migrate from areas of higher extruder die pressure, to areas of lower extruder die pressure. This results in a sheeting product having varying layer thicknesses across the width of the sheet.

On the other hand, when the polymeric material extruded is one of high viscosity, the polymer will tend to remain at its central entry point on the sheet and will not migrate. This results in a sheeting product having a layer of decreasing thickness away from the center.

Furthermore, in known processes and apparatus, it was not readily possible to adjust the relative thickness of the various layers, in response to different processing characteristics and/or different requirements for the final products. Crude control of pressures and flow rates was utilized in an attempt to monitor the quantity of co-extrudant being applied to the sheeting. For example, a plurality of valve plates were machined, each providing a different flow rate of co-extruded polymer. These were manually exchanged according to process requirements. This type of control did not, in many cases, provide the level of control necessary in many processes and products.

The present invention is directed to an improved laydown means for the application of multiple-layers of polymeric material to an initial polymeric base layer, the different polymeric materials in most cases exhibiting different processing characteristics. The laydown device permits easy adjustment of overall layer thickness.

The present invention is also concerned with an improved laydown means and process for use in the production of multiple-layer sheeting of materials, particularly those which have different processing characteristics, resulting in a uniformity of layer thickness across the entire width of the extruded sheeting.

SUMMARY OF THE INVENTION

It is therefore an object of the present invention to provide a co-extrusion apparatus for producing multiple-layer sheeting having an improved laydown means.

Yet another object of the present invention is the provision of an apparatus for producing multiple-layer sheeting having an improved laydown means which can provide online variation of layer thickness.

Another object of the present invention is the provision of an apparatus for producing multiple-layer sheeting having an improved laydown means for applying a layer or layers of uniform thickness(es) across their width.

Still another object of the present invention is to provide a co-extrusion apparatus for producing multiple-layer sheeting having an improved laydown means for applying polymers of varying viscosity to result in sheeting having uniform thickness across the width thereof.

Still yet another object of the present invention is the provision of an improved laydown means for producing multiple-layer sheeting having a simple externally controllable means for adjusting layer thickness.

An additional object of the present invention is to provide a co-extrusion apparatus for producing multiple-layer sheeting having a laydown means for applying a layer or layers of polymeric materials to a base polymer layer, wherein the polymeric materials exhibit different processing characteristics, resulting in sheeting comprising a layer or layers of uniform thickness(es) across their width.

Still another object of the present invention is the provision of an apparatus for producing multiple-layer sheeting having simple means for controlling the thickness of individual layers at any point across the entire width of the sheeting and for controlling the number of the layers of the sheeting.

A further object of the present invention is to provide a process for producing in a single extrusion step multiple-layer sheeting wherein the number and thickness of layers can be simply controlled.

A still further object of the present invention is to provide a process for producing in a single extrusion step multiple-layer sheeting having uniform layer thickness across the width of the sheeting.

Yet another object of the present invention is the provision of a process for producing a multiple-layer sheeting applicable to a wide variety of polymeric materials for use as both the extruded base layer and the co-extruded laydown resin.

Thus, in accomplishing the foregoing and other objectives, there is provided in accordance with one aspect of the present invention a valve plate for applying co-extruded thermoplastic synthetic resin streams to a base polymeric layer or to other thermoplastic synthetic resin streams, comprising a body portion comprising two cavities partially extending through the thickness thereof and positioned on opposite sides of a polymer base layer flow channel which extends entirely through the body portion and further comprising two receiving areas positioned radially outwardly of the cavities for receiving the thermoplastic synthetic resin streams, the streams passing from said receiving areas longitudinally across the openings of the cavities to the flow channel for application to the base layer, and resin flow control means located in each of the cavities, the resin flow control means being cam-actuated to adjust the position of the control means in the cavities.

In accordance with a preferred embodiment, the valve plate further comprises a bolt operative with each of the control means comprising a threaded end portion, a main body portion and a cam, the bolt, upon rotation, positioning the cam to provide the requisite flow controlling position.

In another aspect of the present invention, there is provided a laydown means for the application of multiple layers of thermoplastic synthetic resinous material to an initial polymeric base layer, comprising a feedblock for receiving at least one resin stream and for preparing the stream for application to the base layer, and a valve plate for receiving the stream from the feedblock and applying the stream to the base layer, the valve plate comprising a control means for controlling the flow of the resin to be applied to the base layer.

In a preferred embodiment, the controlling means comprises a cam-actuated member.

In yet another aspect of the present invention there is provided a process for providing a multi-layer sheeting, comprising the steps of extruding a base layer stream of a heat-plastified material, co-extruding at least one side stream of a heat-plastified material, passing the sidestream through a valve plate, controlling the sidestream by means of a control means contained in the valve plate, and passing and applying the controlled sidestream to the base layer.

In a more preferred embodiment, the process further comprises the step of actuating the control means movement by adjusting a bolt having at its opposite end a cam positioned in a cavity of the control means, wherein rotation of the bolt positions the cam to advance or retract the control means in the resin sidestream flow path.

Other objects, features and advantages of the present invention will become apparent from the detailed description of preferred embodiments which follows, when considered in view of the accompanying drawings.

BRIEF DESCRIPTION OF THE DRAWINGS

In the drawings:

FIG. 1 is a schematic perspective view of the valve plate of the present invention;

FIG. 2 is a top view of the valve plate according to the present invention;

FIG. 3 is a cross-sectional view of the valve plate taken along the line 3—3 of FIG. 2;

DETAILED DESCRIPTION OF PREFERRED EMBODIMENTS

In accordance with the present invention, there have been provided an improved apparatus and process for producing a multiple-layer sheet or film having layers of uniform thickness across the entire sheeting or film. More specifically, the present invention relates to an improved valve plate and process thereof for applying co-extruded layers of resinous material to a polymeric base layer and/or other co-extruded layers which provide for accurate control of the co-extruded flows across the entire width of the sheeting. Additionally, this flow stream control is provided such that external control is possible without the previous necessity of removing the valve plate for replacement with a different plate or for machining of the plate in order to obtain the necessary flow dimensions. The external control provided by the present invention simply entails minor mechanical adjustment without the previous time-consuming and cost-intensive manipulation of the valve plates.

The present invention is particularly useful in the production of sheeting or film produced from two or more polymeric materials exhibiting different processing characteristics, particularly melt viscosity. As previously mentioned, the migratory problems resulting from the use of polymers of different viscosities result in sheeting having either a high concentration of polymer in the center of the sheet or at the edges thereof, depending upon whether high or low viscosity polymer was present. The present invention solves this problem, along with many others. A better understanding of the invention will be possible from a review of the following detailed description taken in view of the drawings.

Figure 13:
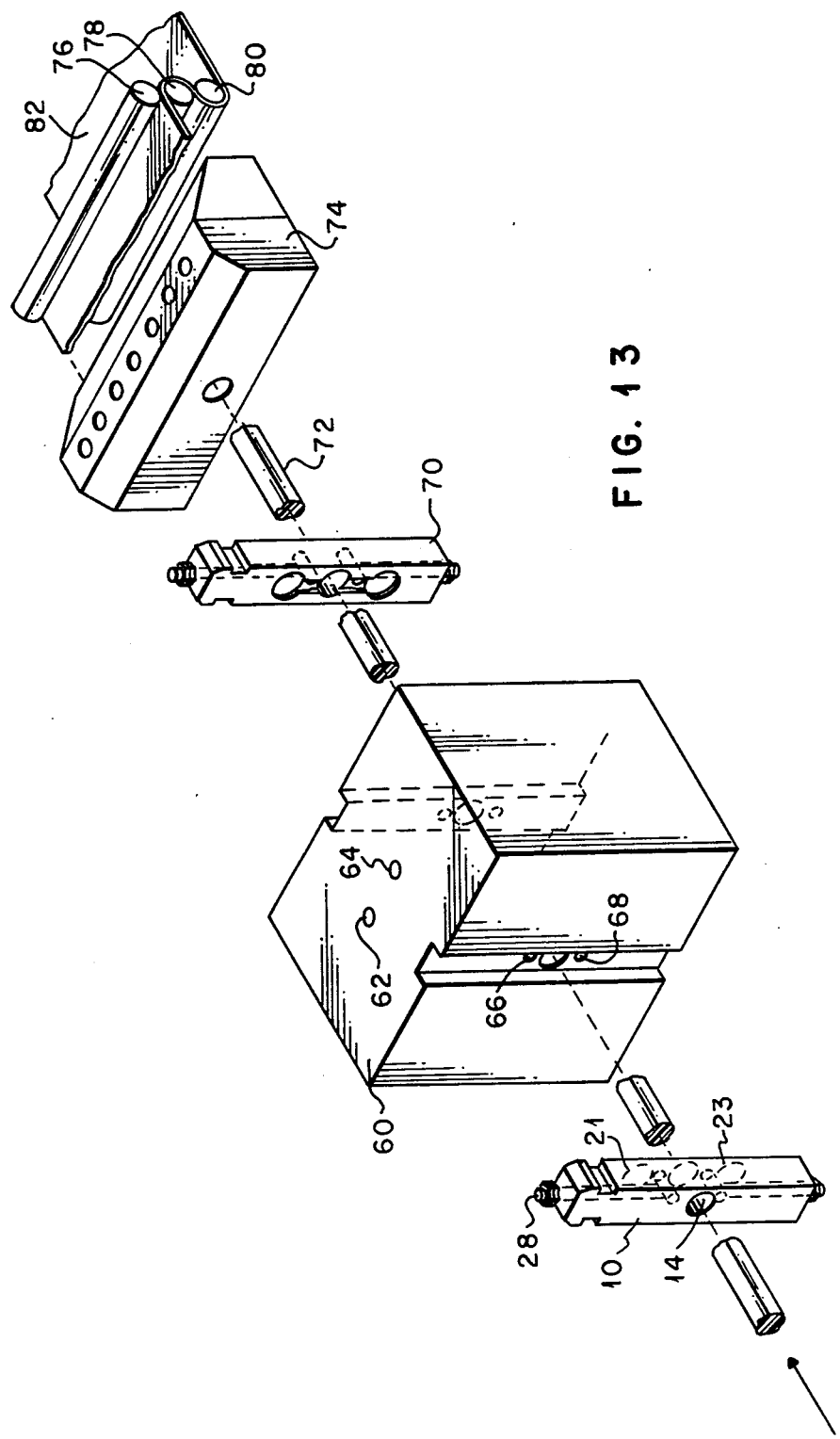
FIG. 13 is an exploded perspective view of the coextrusion feedblock and valve plate arrangement.

FIG. 1 schematically illustrates the valve plate of the present invention. The valve plate 10 includes a body portion 12 having a flow channel 14 extending entirely through the plate 10. Located on opposite sides of the flow channel 14 along the longitudinal axis of the body are two cavities 16 and 18 which extend partially through the body along the transverse axis in a direction parallel to that of flow channel 14. The cavities 16 and 18 are connected to the flow channel 14 by means of slotted channels 20 and 22. The slotted channels extend radially outwardly past the cavities and form circular inlet slots 21 and 23 which communicate with resin feed means as shown in FIG. 13, and as will be described later. The valve plate further comprises a pickup channel 25 at the top end of the plate which has been machined to provide for easy grasping and removal of the valve plate 10 when replacement is required.

FIG. 2 is a frontal view of the valve plate 10 in a laid flat position and similarly shows the valve plate as described above.

FIG. 3 is a cross-sectional view taken along line 3—3 of FIG. 2. As evidenced by this representation, the cavities 16 and 18 extend transversely into the body 12 so as to communicate with bore channels 24 and 26, respectively. These channels extend longitudinally through the central portion of the valve plate 10 extending from the cavities 16, 18 to the outer radial edge of valve plate. Each of the channels 24 and 26 are threaded in the region approaching the radial edge for receiving threaded bolts 28 and 30.

Figure 5:
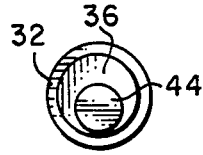
FIG. 5 schematically represents the bolt illustrated in cross section in FIG. 3.

With reference to FIG. 5 there is shown threaded bolt 28. The bolt is comprised of three main parts, a threaded region 32, a main body portion 34 and an cam 36. The threaded head region 32 cooperatively engages the threaded region of the bore channel so as to be adjustable within the cavity. Also, the end area of the threaded head portion 32 is provided with a means by which to adjust the bolt. The bolt may be a screw-type bolt having a machined head or a bolt having nuts supplied to the end thereof by which the bolt may be adjusted. Other threaded bolt arangements will be obvious to the skilled artisan. The particular design of the bolt head is not limitative. In the present embodiment as illustrated in FIGS. 1-3, the bolts 28 and 30 are provided with nuts 38 and 40, respectively, for adjusting the bolts.

Figure 4:
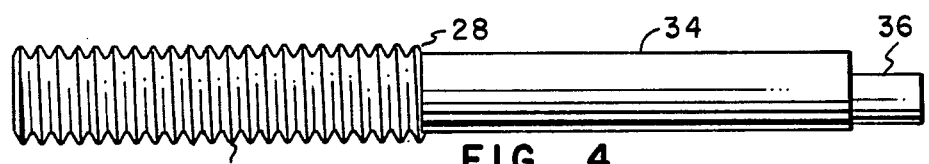
FIG. 4 is a partial cross-sectional view of the resin flow control means/cam arrangement of the valve plate.
Figure 6:
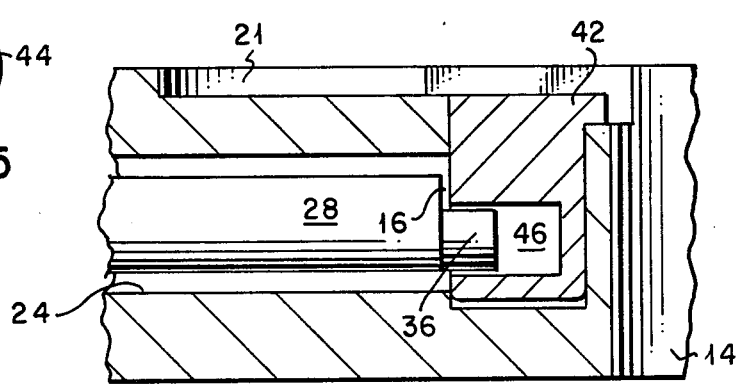
FIG. 6 is an end view of the bolt of FIG. 5 in the direction of the arrow.

FIG. 6 represents an end view, in the direction of the arrow of FIG. 5, of the bolt showing the threaded region 32, the main body 34 and the cam 36. The cam end of each of the bolts engages a cam-actuated control means, hereinafter referred to as a camsert, which is positioned inside each of the cavities. With particular reference to FIG. 4, the bolt 28 within the channel 24 comprises the cam 36 which engages a camsert 42. The camsert has an elliptically-shaped slot 46 for receiving the cam 36. The camsert is positioned in the cavity 16 for transverse movement with regard to the flow of co-extruded resin from the inlet slot 21 to the flow channel 14. A similar camsert arrangement is utilized with regard to bolt 30 and cavity 18.

Figure 7:
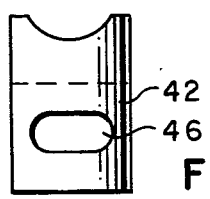
FIGS. 7–12 illustrate the various views of the resin flow control means.
Figure 8:
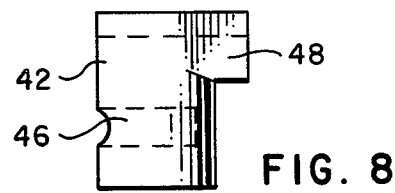

In FIGS. 7–12 are illustrated the various views of the camsert 42. For reference purposes, the front view corresponds to viewing the camsert from the flow channel 14 longitudinally toward the outer edge of the plate 10. FIG. 7 illustrates the elliptical slot 46 for housing the cam end of the threaded bolt. In FIG. 8 is illustrated a side view of the camsert showing neck 48 which assists in positioning the camsert within the cavity 16 and in relation to flow channel 14. In operation, the neck 48 should line up flush with the outer edge of flow channel 14 so as not to retard the polymer flow.

Figure 9:
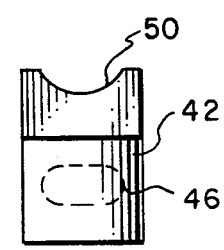
Figure 10:
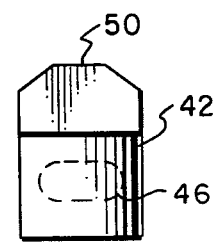

FIGS. 9 and 10 serve to illustrate the shape(s) of the surface 50 of the camsert which is in contact with the copolymer flow stream. The particular shape selected depends particularly on the viscosity of the copolymer employed. In FIG. 9, a concave contacting surface is illustrated. Such a surface is applicable in the co-extrusion of low viscosity polymers. By concentrating a majority of the copolymer in the central area of the camsert, and thus of the sheeting, this acts to offset the tendency of the low-viscosity polymer to migrate to the outer extremities of the sheeting. Likewise, when a highly viscous polymer is present, a camsert like that of FIG. 10 is utilized having a convex contacting surface. This convex shape functions to force the highly viscous material outwardly to avoid a high concentration of polymer in the central region of the resulting sheet. Various modifications can be made to the contacting surface to achieve a plurality of camserts for use with polymers of varying viscosity.

Figure 11:
Figure 12:
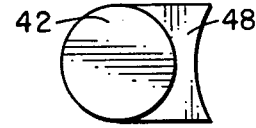

FIG. 11 is a top view of the camsert showing the contacting surface. FIG. 12 is the corresponding bottom view which illustrates the circular shape of the camsert necessary to match the circular cavity. Also illustrated is the neck 48 of the camsert and, more particularly, this view shows the concave shape of the neck surface which is required so as to conform to the tubular shape of the extruded base layer.

The means for supplying the copolymer to the valve plate is seen in FIG. 13. There is shown a feedblock 60. The feedblock 60 has inlet orifices 62 and 64 for receiving co-extruded resin streams. The resin stream entering the feedblock 60 at orifice 62 is transported through the feedblock, divided into two streams (not shown) and made to exit the feedblock through the outlet orifices 66 and 68. An appropriate feedblock for use herein is disclosed in copending application Ser. No. 408 105, now U.S. Pat. No. 4,443,397 issued Apr. 17, 1984 Multiple-Layered Sheeting Device and Process Therefor, filed Aug. 16, 1982, the disclosure of which is hereby incorporated by reference.

The resin stream entering at inlet orifice 64 progresses through the feedblock in a manner similar to the resin entering at orifice 62. A second valve plate 70 is located at the opposite end of the feedblock from valve plate 10 along the direction of flow of the base layer stream. The valve plate 70 functions similarly to that of valve plate 10.

Located downstream of the feedblock and valve plate arangement are a sheeting die 74 and cooling rollers 76, 78 and 80 for flattening and finishing the film or sheeting as required producing the finished multiple-layer product 82.

In operation, referring first to FIG. 13, a base layer polymer stream which has been extruded upstream (not shown) is transported to the flow channel 14 of the first valve plate 10. Likewise, thermoplastic resinous materials from upstream co-extruders (not shown) are transported to the inlet orifices 62 and 64 of the feedblock 60. For the sake of convenience, the polymer stream entering at orifice 62 will be described hereinafter, it being understood that the polymer of inlet orifice 64 progresses in the same manner. After having been divided into two streams, the co-extruded polymer exits the feedblock 60, through outlet orifices 66 and 68. The polymer streams exiting the feedblock flow to the circular inlet slots 21 and 23, respectively, of valve plate 10.

Referring now to FIGS. 1–3, the polymer entering the valve plate at inlet slots 21 and 23 progress radially inwardly to the flow channel 14 along the slotted channels 20 and 22. In so doing, the polymer passes over the openings of the cavities 16 and 18, each having therein a camsert 42. During operation, the starting position of the camsert 42 may be that as illustrated in FIG. 4. Here the contacting surface is flush with the back surface of the slotted channel, thus allowing uninterrupted flow of the polymer from the inlet slot to the flow channel 14.

Should it be necessary to reduce the flow of the co-extruded polymers, the camsert 42 can be actuated to progress outwardly of the cavity 16, i.e., transversely to the flow of the advancing co-extruder polymer, thus reducing the flow space, and likewise, the flow.

The advancement of the camsert is accomplished by means of the threaded bolt 28. The bolt, as mentioned previously, has at its far end an cam 36 which is housed within the elliptically-shaped slot 46 of the camsert 42. In its initial position described above, having the camsert surface and the backside of the slotted channel flush with one another, the cam is positioned within the elliptical slot so as to be disengaged. As the need arises for reducing the co-extruded polymer flow, the threaded bolt 28 is adjusted by nuts 38 and 40 so as to engage the walls of the elliptical slot and advance the camsert into the co-extruded polymer flow path. Likewise, should the flow be too restricted, the reverse adjustment of the threaded bolt and cam would be required.

The controlled polymer flow then progresses to the flow channel 14 where the co-extruded polymer is applied to the base polymer layer. Depending on the design conditions, one or two layers of the co-extruded polymers can be applied to the base layer from valve plate 10. The multiple-layer stream leaving valve plate 10 progresses through the feedblock 60 to a similar valve plate, shown schematically at 70 in FIG. 13, which functions identically to valve plate 10. The resulting tube 72 is passed through a sheeting die 74 and cooling rollers 76, 78 and 80 to form the final product sheeting 82.

Therefore, by the invention, there can be produced a sheeting and/or film comprising from 1 to 5 layers, each of uniform thickness, which enjoys the advantageous properties of each of the different polymers used.

Importantly, the present invention provides an improved means for making a co-extruded multiple-layer sheeting or film. More importantly, there is provided a means for controlling each of the co-extruded polymer flows by simple external adjustment and, therefore, allowing online control of the layer thicknesses. In combination with the feedblock arrangements described, which also have external control means, a co-extrusion apparatus results which makes control of the sheeting or film produced a simple, easy-to-adjust operation.

The extruded base layer advantageously comprises a relatively inexpensive polymer having good strength properties, e.g., polystyrene, polyethylene, etc.

The co-extruded resinous materials can be selected from a variety of polymeric material depending upon the material characteristics necessary. Both crystalline and amorphous polymers can be employed. Examples of appropriate types of polymeric materials include the polyesters, such as polyethylene terephthalate; the vinyl aromatic or styrenic polymers, including substituted and unsubstituted styrene polymers and copolymers, high impact polystyrene comprised of styrene-rubbery polymer blends, graft copolymers and block copolymers, and ABS-type resins; polyolefins, such as polyethylene and polypropylene; nitrile-containing resins, such as copolymers containing a major proportion of acrylonitrile; acrylic materials, such as polymers and copolymers of acrylic and methacrylic acid esters; vinyl esters, such as polyvinyl chloride and vinylidene halide polymers; polyamides; polycarbonates; and various blends and mixtures of these generally well known classes of polymeric materials. Any thermoplastic synthetic resins which are customarily extruded are within the scope of the invention.

The following specific example is provided to facilitate a better understanding of the invention, it being understood that the same is intended to be merely illustrative and in no way limitative.

EXAMPLE

A main resin stream of high impact polystyrene (Cosden Oil and Chemical Co. 825D pellets) is extruded from a 4½ inch diameter two stage vented extruder containing a 4:1 compression ratio screw. Two 1¼ inch diameter 24:1 single stage side extruders also having a 4:1 compression ratio screw a first sidestream of DuPont CXA 1104 adhesive, and a second sidestream of PETG (polyethylene terephthalate glycol). The polystyrene is extruded at a temperature of 240° C. and a feed rate of approximately 1000 lbs./hr. The adhesive sidestream is discharged from the 1¼ inch extruder at 200° C. and at a feed rate of approximately 15 lbs./hr. The PETG stream is discharged from the 1¼ inch extruder at 250° C. and at a feed rate of approximately 150 lbs./hr.

The first sidestream is divided into two streams. The flow of one of the two streams is then completely stopped so that only one layer of adhesive is applied to form an intermediate layer on one side of the polystyrene. The second side stream is also divided into two streams, and likewise, the flow of one of these two streams is completely stopped so that only one layer of PETG is applied, the PETG layer being applied to the adhesive layer previously formed. There results a single stratified stream having junction interfaces between the three separate layers. The combined stream is conducted to an extrusion die orifice 52 inches wide with lips set at approximately 80 mils. The die temperature averages about 230° C.

Upon leaving the die lips, the extruded sheet passes a series of three 12-inch polished chrome cooling rolls, the top roll maintained at 40° C., middle roll at 95° C. and bottom roll at 65° C. Roll pressures at top and bottom are maintained at 23 psi and 18 psi, respectively, and at a gap setting of 80 mils.

Examination of the final sheeting product evidences essentially uniform layers of the PETG, adhesive and impact polystyrene. The thickness of the layers of the impact polystyrene is 100 mils. The thickness of the adhesive layer is approximately 1 mil, and the thickness of the PETG is 10 mils. The individual layers are of uniform thickness across the entire width.

Thus, there has been provided according to the invention a process for co-extruding multi-layer sheeting having uniform layer thicknesses.

While the fundamental novel features and advantages of the invention have been pointed out in connection with a few illustrated embodiments thereof, it will be appreciated that various obvious modifications of the co-extrusion process and apparatus will suggest themselves to one of ordinary skill in the art. Therefore, it is intended to be limited only by the scope of the following claims.

What is claimed is:

1. A valve plate for applying co-extruded thermoplastic synthetic resin streams to a base polymer layer or to other thermoplastic synthetic resin streams, comprising:
   a body portion, comprising:
     two cavities partially extending through the thickness thereof and positioned on opposite sides of a polymer base layer flow channel which extends entirely through said body portion;
     two receiving areas positioned radially outwardly of said cavities for receiving the thermoplastic synthetic resin streams, said streams passing from said receiving areas longitudinally across the openings of said cavities to said flow channel for application to said base layer; and
     a slotted end region for grasping and removing the valve plate;
   resin flow control means located in, but independent of and separately removable from, each of said cavities, said resin flow control means comprising an elliptically-shaped orifice and a resin engaging surface which is shaped according to flow considerations; and
   means for positioning said control means, said positioning means extending transversely from each of said cavities and longitudinally through said body portion and extending past the edge of said body portion and comprising a cam at the cavity end thereof, said cam engaging said elliptically-shaped orifice, wherein said cam, upon rotation, causes movement of said flow control means within said channel to control said resin flow to the base layer.

2. A valve plate as defined in claim 1, wherein said positioning means comprises a threaded bolt having said cam at the proximal end thereof.

3. A valve plate as defined in claim 1, wherein said cam-actuated control means moves transversely to said resin stream flow to systematically control said resin flow to the base layer.

4. A valve plate as defined in claim 1, further comprising a neck portion at the point of intersection of said base layer and said resin stream flows for positioning said cam-actuated control means in said flow channel.

5. A valve plate as defined claim 1, wherein the face of said control means contacting said resin stream is concave.

6. A valve plate as defined in claim 1, wherein the face of said control means contacting said resin stream is convex.

7. A laydown means for the application of multiple layers of thermoplastic synthetic resinous material to an initial polymeric base layer, comprising:
- a feedblock for receiving at least one resin stream and for preparing said stream for application to the base layer; and
- a valve plate for receiving said stream from said feedblock and applying said stream to the base layer, said valve plate including:
- a body portion, comprising:
  - two cavities partially extending through the thickness thereof and positioned on opposite sides of a polymer base layer flow channel which extends entirely through said body portion;
  - two receiving areas positioned radially outwardly of said cavities for receiving the thermoplastic synthetic resin streams, said streams passing from said receiving areas longitudinally across the openings of said cavities to said flow channel for application to said base layer; and
  - a slotted end region for grasping and removing the valve plate;
- resin flow control means located in, but independent of and separately removable from, each of said cavities, said resin flow control means comprising an elliptically-shaped orifice and a resin engaging surface which is shaped according to flow considerations; and
- means for positioning said control means, said positioning means extending transversely from each of said cavities and longitudinally through said body portion and extending past the edge of said body portion and comprising a cam at the cavity end thereof, said cam engaging said elliptically-shaped orifice, wherein said cam, upon rotation, causes movement of said flow control means within said channel to control said resin flow to the base layer.

8. A laydown means as defined in claim 7, further comprising a means positioned for external adjustment comprising a cam for positioning said control means.

9. A laydown means as defined in claim 8, wherein said control means comprises an elliptically-shaped orifice for receiving said cam, wherein said cam, upon rotation, causes lateral movement of said control means in relation to said positioning means.

10. A laydown means as defined in claim 9, wherein said positioning means comprises a threaded bolt having said cam at the proximal end thereof.

11. A process for providing a multi-layered sheeting, comprising the steps of:
- extruding a base layer stream of a heat-plastified material through a feedblock assembly comprising a feedblock and at least one valve plate which is separately removable from said feedblock assembly;
- coextruding at least one sidestream of a heat-plastified material;
- passing said sidestream through said at least one valve plate;
- controlling the flow of said sidestream through said valve plate by means of a cam-actuated control means positioned in the path of flow of said sidestream, said controlling step involving externally operating a positioning means having a cam which engages said control means to variably position said control means in an essentially transverse manner to the flowpath of said sidestream;
- modifying the contour of said sidestream by exchanging said control means with another control means, wherein each of said control means has a different pre-determined contoured sidestream-engaging surface and is independent of and separately removable from said valve plate without effecting said feedblock; and
- passing and applying said controlled sidestream to said base layer.

12. A process as defined in claim 11, wherein said control means moves transversely to said sidestream flow.

13. A process as defined in claim 12, further comprising the step of actuating the control means movement by adjusting a bolt having at its opposite end a cam positioned in a cavity of said cam-actuated control means, wherein rotation of said bolt positions said cam to advance or retract said control means in the resin sidestream flow path.

* * * * *